Feb. 9, 1932. J. A. WINTROATH 1,844,619
COMBINATION AUTOMATIC COMPENSATING BEARING
AND STUFFING BOX FOR TURBINE PUMPS
Filed July 30, 1925 2 Sheets-Sheet 1
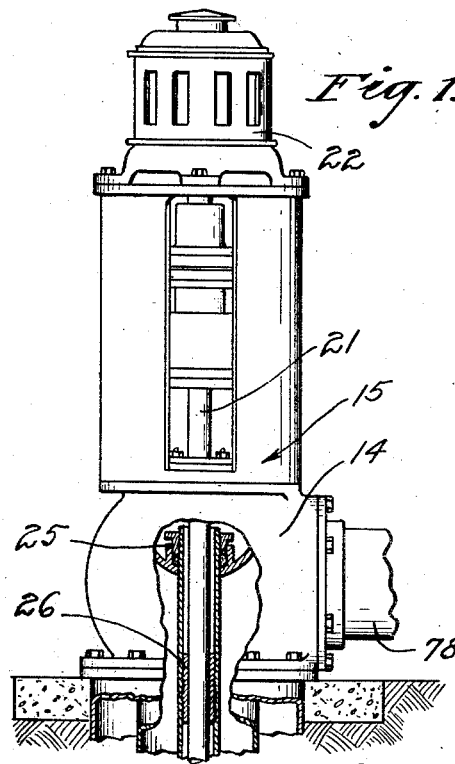
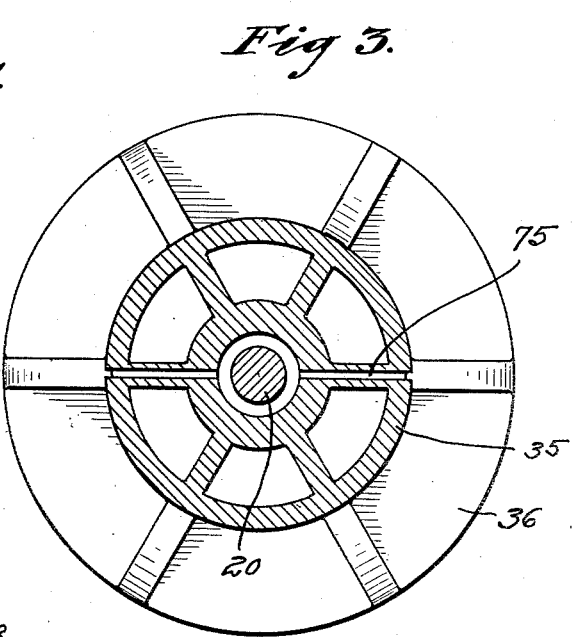
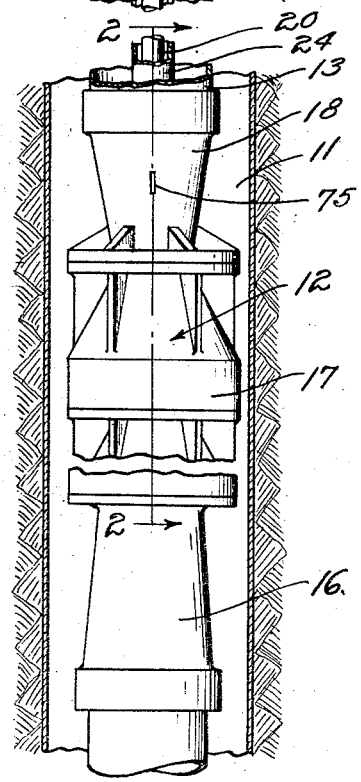
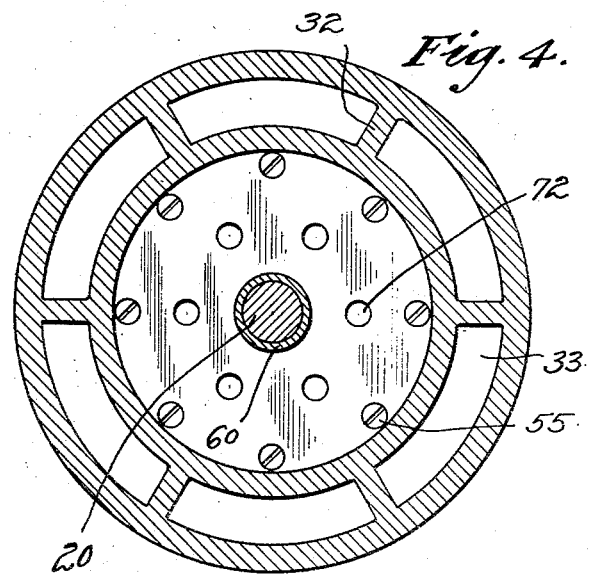
INVENTOR.
JOHN A. WINTROATH,
BY
ATTORNEY.

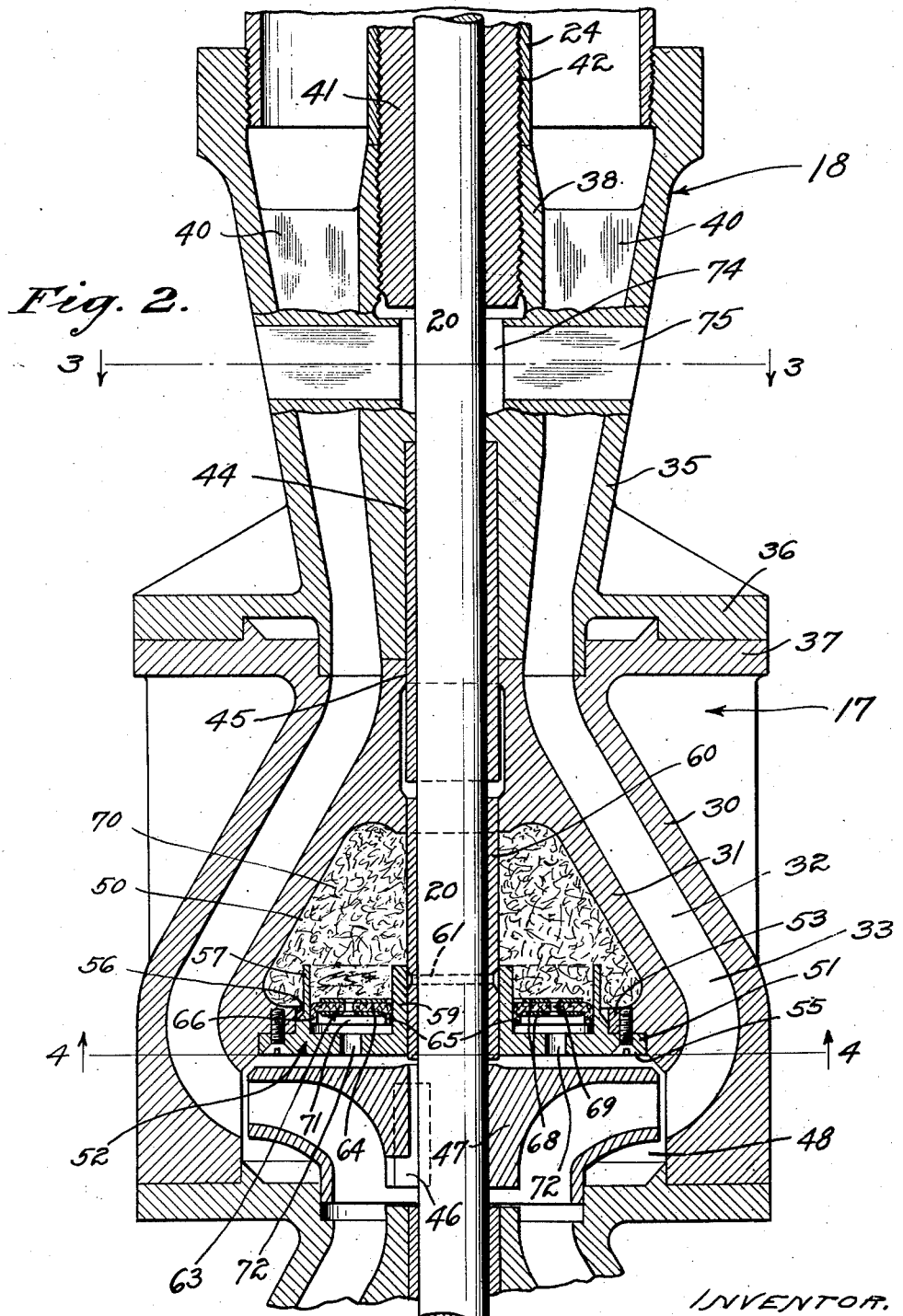

Patented Feb. 9, 1932

1,844,619

UNITED STATES PATENT OFFICE

JOHN A. WINTROATH, OF LOS ANGELES, CALIFORNIA, ASSIGNOR TO PEERLESS PUMP COMPANY, OF LOS ANGELES, CALIFORNIA, A CORPORATION OF CALIFORNIA

COMBINATION AUTOMATIC COMPENSATING BEARING AND STUFFING BOX FOR TURBINE PUMPS

Application filed July 30, 1925. Serial No. 46,981.

My invention relates to vertical turbine pumps, the principal use of which is pumping water for irrigation and other purposes.

A pump of the general class to which my invention may be applied comprises a pump section which is situated at the bottom of the well. Secured to this pump section is a column pipe which extends upward through the well and is attached to a pump head situated at the surface of the ground. The pump section comprises an upper bearing section, a lower bearing section and a plurality of stages which are situated between these bearing sections. In each of the stages there is an impeller which is secured to a pump shaft, this pump shaft extending upward through the column pipe being drivably attached to the pump head. The stages and upper and lower bearing sections include bearings for journaling the pump shaft in the pump section. A line tube surrounds the pump shaft, this line tube extending from the upper bearing section to the pump head. This line tube carries line bearings for supporting the pump shaft and has a stuffing box closing the upper end thereof through which the pump shaft extends to the driving mechanism of the pump head.

During the operation of this pump the bearings wear and permit a slight leakage around the pump shaft. Well water generally carries particles of sand or abrasive substances and these abrasive particles quickly cut and wear away the shaft and bearings. When the main bearing of the pump which is carried in the upper bearing section wears sufficiently to leak, due to the high pressure in the pump water is forced upward through the line tube, contacting the line bearings. The abrasive substance in this water wears away the bearings with rapidity. Although the stuffing box at the upper end of the line tube thereby prevents a leakage thereat, it does not prevent a forcing of water carrying abrasive particles into the line tube and therefore does not protect the line bearings. There are sometimes as many as seventy-five line bearings in a pump. To replace these bearings and replace the pump shaft is obviously very expensive. Also the time required to move, make such repairs and reinstall the pump is considerable. Also such repairing may be necessary when a user needs water the most and therefore may cause much damage to his property.

It is an object of my invention to provide a turbine irrigation pump similar to the one described having means which prevents a forcing of water upward through the line tube. This excludes abrasive particles from the line bearings and they will not be badly cut and worn away as in the present pump.

It is an object of my invention to provide a stuffing box adjacent to the main bearings of the pump, which stuffing box prevents a leakage of water from the pump section and thus prevents a reduction in efficiency.

It is a further object of my invention to provide a stuffing box of this character which is hydraulically operated.

A still further object of my invention is to provide a combined automatic compensating bearing and stuffing box which will automatically compensate for any wear on the bearing or shaft and which will prevent a leakage from the pump section around the pump shaft.

Other objects and the particular advantages of my invention will be made manifest hereinafter.

Referring to the two sheets of drawings in which I illustrate a preferred form of my invention, Fig. 1 is a diagrammatic view illustrating the utility of my invention.

Fig. 2 is an enlarged fragmentary section taken through the upper part of a pump having the features of my invention.

Fig. 3 is a section taken on the line 3—3 of Fig. 2.

Fig. 4 is a section taken on the line 4—4 of Fig. 2.

With reference to Fig. 1, in a well 11 I place a pump section 12 which is secured to the lower end of the column pipe 13. The column pipe 13 extends upward through the well 11 and is attached to a body 14 of a pump head 15. The pump section 12 comprises a lower bearing section 16, a plurality of stages 17 and an upper or main bearing section 18. Extending from the pump section 12 is a pump shaft 20 which is connected at its upper end to a shaft 21 of a drive motor 22, which drive motor 22 drives the shaft 20. Also extending from the pump section 12 to the pump head 15 is a line tube 24, which line tube 24 surrounds the pump shaft 20. The line tube 24 has a stuffing box 25 arranged at the upper end thereof to prevent a leakage of water therearound from the pump body 14 and carries a number of line bearings 26 according to the length of the tube.

With particular reference to Figs. 2 to 4 of the drawings I shall describe in detail the features of my invention. My invention is arranged for installation in an upper stage 17 and the main bearing section 18. The upper stage 17 comprises a shell 30 and a core 31 which are separated by diffusion vanes 32 so as to provide a water passage 33. The upper bearing section 18 has a shell 35, on the lower end of which there is formed a flange 36 which rests on a flange 37 of the upper stage 17, by which flanges 36 and 37 these two castings are attached together. A hub 38 is supported inside the shell 35 by vanes 40. Threadedly secured in the upper end of the hub 38 is a main bearing 41 to which the lower end of the line tube 24 is threadedly secured such as indicated at 42. A bearing bushing 44 is pressed into the lower end of the hub 38, the lower end of which bearing bushing extends into the upper end of a cylindrical opening 45 provided at the upper end of the core 31 of the upper stage 17. The pump shaft 20 extends through the main bearing 41, the hub 38, the bearing bushing 44 and through the core 31 of the stage 17. A key 46 secures an impeller 47 to the shaft 20, this impeller 47 being located in an impeller chamber 48 of the stage 17.

The core 31 provides a packing chamber 50. A flange 51 of a compression member guide 52 is secured against an annular ledge 53 formed at the lower part of the packing chamber 50 by screws 55. Extending upwardly from the flange 51 into the packing chamber 50 and in engagement with a cylindrical face 56 of the annular ledge 53 is an outer tube 57. An inner tube 59 extends upwardly into the packing chamber 50, surrounding and journaling a pump shaft bearing sleeve 60. The pump shaft bearing sleeve 60 is secured to the pump shaft 20 by a rivet 61. The lower part of this sleeve 60 is surrounded by the inner tube 59. The central part of the tube extends through the packing chamber 50 and the upper end of the tube extends into the lower end of the opening 45 at the upper end of the core 31.

In an annular compression member chamber provided between the outer and inner tubes 57 and 59 is a pressure-transmitting means in the form of a compression member 63. This compression member 63 is provided in the form of an annular cup leather 64 having an inner lip 65 which engages an outer cylindrical face of the inner tube 59 and an outer lip 66 which engages an inner cylindrical face of the outer tube 57. The cup leather 64 is reinforced by plates 68 arranged on either side of the leather and secured by rivets 69. Packing 70 is placed in the packing chamber 50 above the compression member 63 and is adapted to be compressed thereby as will be subsequently described. The packing may be a mixture of lignum-vitæ, sawdust and shavings mixed with graphite and oil. This mixture makes the packing which forms a suitable bearing and operates efficiently as a packing in the presence of water. An annular space 71 below the compression member 63 is communicated with the impeller chamber 48 by a plurality of orifices 72 provided in the compression member guide 52.

An annular chamber 74 formed in the hub 38 between the lower end of the main bearing 41 and the upper end of the bearing bushing 44 is communicated with the exterior of the main bearing section 18 by by-passes 75 which are formed in certain of the vanes 40 of this main bearing section 18.

The operation of the pump just described is substantially as follows:

The motor 22 is supplied with energy which causes an operation thereof. The pump shaft 20 is rotated through the shaft 21 and in turn rotates the impellers of the pump section 12. The impeller 47 draws water from a lower section, forcing this water through the stage in which it is located, which water is afterwards taken by another impeller and forced upward through the pump section. The water passes through the main bearing section 18 into the column pipe 13, is carried by the column pipe 13 to the pump head body 14 and is conducted from the pump body 14 through a discharge pipe 78.

As previously mentioned, as the bearings of the pump wear there is a tendency for leakage. In a pump installed at a depth of about 200 feet the pressure per square inch tending to force the water between the bearings and the shaft is about ninety pounds per square inch. This water in most cases carries particles of sand or other abrasive. These abrasive particles work in between the shaft and the bearings and badly cut and wear them so that the efficiency of the pump is greatly reduced.

When the pump is in operation the pressure of water in the pump is supplied to the space 71 below the compression member 63 by means of the orifices 72. This pressure in the space 71 forces the compression member 63 upward, compressing packing 70 in the packing chamber 50. This forces packing 70 against the pump shaft bearing sleeve 60 forming a bearing and also forming a tight stuffing box packing at the upper end of the pump below the main bearing 41, thus supporting the shaft and preventing leakage.

Any water which may leak through the arrangement of my invention will pass around the shaft through the bearing bushing 44 into the chamber 74 of the hub 38. This leakage water may be passed to the exterior of the main bearing section 18 through the by-passes 75. Were not the by-passes 75 provided, pressure would build up which would force the leakage water carrying abrasive through the main bearing 41. In time, the main bearing 41 would become badly worn and the leakage water would pass upward through the line tube 24 coming in contact with all of the lined bearings 26, wearing and cutting them so that the replacement of the entire system of bearings and pump shaft would be necessary.

By providing a wear compensating bearing and stuffing box of my invention, a leakage at the upper end of the pump is reduced to a minimum. The by-pass 75 is provided as an additional precaution and any small leakage which may occur will drain to the exterior of the pump and not be forced upward through the main bearing 41 and through the line tube 24. My invention greatly prevents the wear on the bearing of the pump by excluding abrasive materials therefrom and reduces leakage of the pump and thus maintains its efficiency.

It is, of course, not necessary to place the bearing sleeve 60 around the shaft if such a construction is not desired, inasmuch as the packing may be compressed against the surface of the shaft itself. Thus, in the accompanying claims, the term shaft is meant to include either a shaft itself or a shaft equipped with a sleeve therearound.

I claim as my invention:

1. In a pump, the combination of: a stage having a packing chamber, a water passage, and an impeller chamber; a pump shaft extending through said stage; an impeller secured to said pump shaft in said impeller chamber; packing in said packing chamber; a compression member guide closing the lower part of said packing chamber, said guide having an outer tube and an inner tube; and a compression member carried by said guide between said outer and inner tubes, said compression member being adapted to compress said packing around said pump shaft, there being orifices in said guide opening on said impeller chamber and the space between said tubes for allowing hydraulic pressure of water being pumped to operate said compression member.

2. In a pump, the combination of: a stage having a packing chamber and an impeller chamber; a pump shaft in said chambers; an impeller secured to said shaft in said impeller chamber; packing material in said packing chamber and engaging said pump shaft to prevent leakage around said shaft through said packing chamber; a guide member separating said impeller and said packing chambers; and a compression member movable relative to said guide member, said compression member contacting said packing material on one side and the liquid being pumped on the other side to compress said packing material against said pump shaft.

3. A combination as defined in claim 2 in which said guide member journals said shaft.

4. In a pump, the combination of: a stage having a packing chamber and an impeller chamber; a pump shaft in said chambers; an impeller secured to said shaft in said impeller chamber; packing in said packing chamber; a member separating said impeller and packing chambers, said member having an orifice therein communicating with said impeller chamber; and a pressure-transmitting means separating said packing and the liquid passing through said orifice.

5. In combination: walls defining a packing chamber; said walls including a pair of stationary walls defining a compression member chamber, a rotatable member extending into said packing chamber; a pressure-transferring member in said compression-member chamber and extending between and in fluid-tight relationship with said stationary walls thereof; a deformable mass of packing material substantially filling said packing chamber and extending into said compression-member chamber into engagement with one side of said pressure-transferring member; and means for building up a pressure against the other side of said pressure-transferring member.

6. In combination in a turbine pump; a pump section defining a packing chamber and an impeller chamber; a rotatable member extending into said chambers; an impeller in said impeller chamber and driven by said rotatable member; a deformable mass of material substantially filling said packing chamber; a guide member separating said impeller chamber and said packing chamber and defining a compression member chamber spaced from the periphery of said rotatable member and which communicates directly with said impeller chamber; and a compression member extending across said compression member chamber in fluid-tight relationship with the walls thereof, one surface of said compression member contacting said deformable mass of material and the other surface being in contact with fluid under pressure from said impeller chamber.

In testimony whereof, I have hereunto set my hand at Los Angeles, California, this 24th day of July, 1925.

JOHN A. WINTROATH.